(12) United States Patent
Pelhos

(10) Patent No.: US 7,824,562 B2
(45) Date of Patent: Nov. 2, 2010

(54) METHOD OF REDUCING AN ETCH RATE

(75) Inventor: Kalman Pelhos, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 688 days.

(21) Appl. No.: 11/770,195

(22) Filed: Jun. 28, 2007

(65) Prior Publication Data
US 2009/0001047 A1    Jan. 1, 2009

(51) Int. Cl.
*B44C 1/22* (2006.01)
(52) U.S. Cl. ............................................. 216/22
(58) Field of Classification Search ................ 216/22
See application file for complete search history.

(56) References Cited

U.S. PATENT DOCUMENTS

| | | | | |
|---|---|---|---|---|
| 4,233,394 A | * | 11/1980 | Helbert | 430/200 |
| 5,607,599 A | * | 3/1997 | Ichihara et al. | 216/22 |
| 6,778,441 B2 | * | 8/2004 | Forbes et al. | 365/185.26 |
| 2004/0026369 A1 | * | 2/2004 | Ying et al. | 216/63 |
| 2006/0202244 A1 | * | 9/2006 | Ju et al. | 257/295 |

* cited by examiner

*Primary Examiner*—Roberts Culbert
(74) *Attorney, Agent, or Firm*—Westman, Champlin & Kelly, P.A.

(57) ABSTRACT

A method of fabricating a bit patterned storage medium includes obtaining a substrate having a magnetic layer and forming a mask over the magnetic layer. The magnetic layer is etched through the mask using a reactive ion etch. The etch rate of the mask is reduced by introducing a gas into the reactive ion etch.

19 Claims, 6 Drawing Sheets

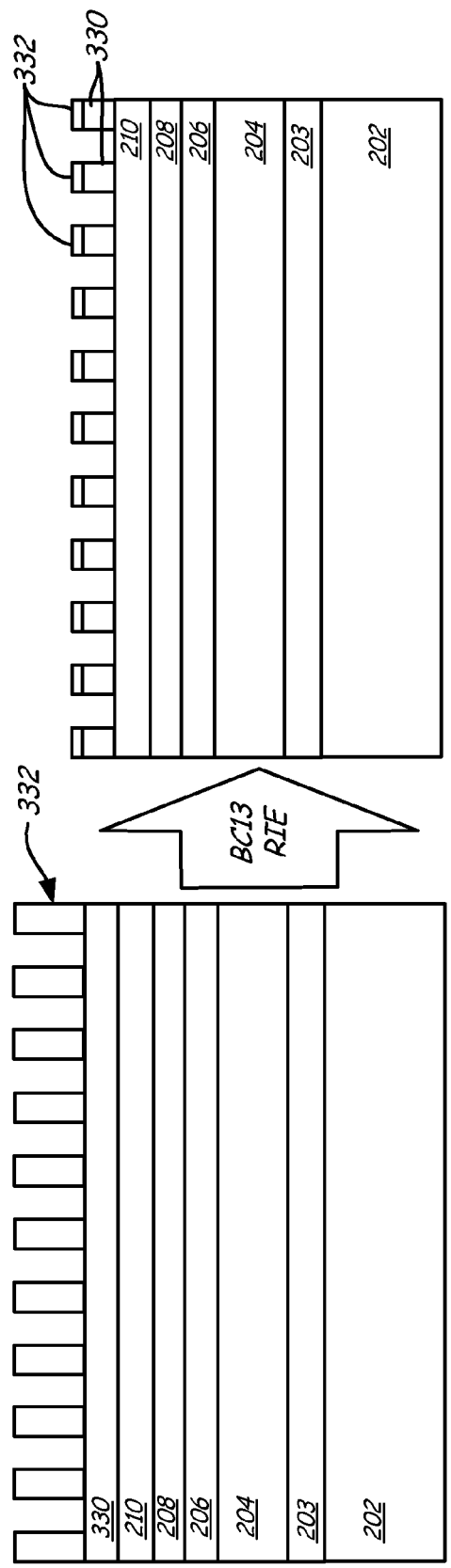
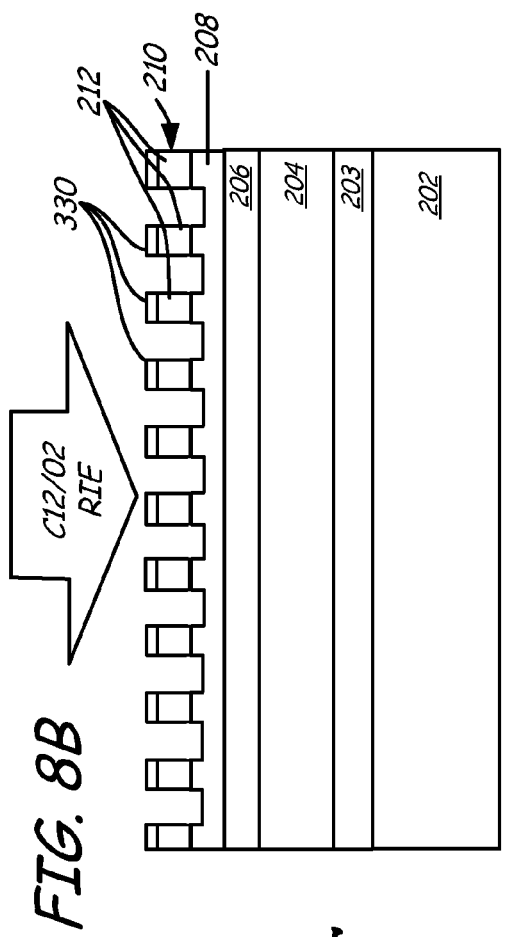
FIG. 8A
FIG. 8B
FIG. 8C

METHOD OF REDUCING AN ETCH RATE

FIELD OF THE INVENTION

The present invention relates to a method for fabricating patterned magnetic recording media and to patterned magnetic recording media obtained thereby. The invention has particular utility in the formation of servo patterns in hard disk magnetic data/information storage and retrieval media and in the formation of bit-patterned magnetic recording media comprising a plurality of discrete magnetic bits.

BACKGROUND OF THE INVENTION

Patterned magnetic recording media, such as servo-patterned media, track-patterned (i.e., discrete track) media, and bit-patterned (i.e., discrete bit) media have been fabricated by a variety of processing techniques, including etching processing such as reactive ion etching, sputter etching, ion milling, and ion irradiation to form a pattern comprising magnetic and non-magnetic surface areas in a layer of magnetic material on a media substrate. Several of the these processing techniques relied upon selective removal of portions of the layer of magnetic material to form the pattern of magnetic and non-magnetic surface areas; whereas others of the processing techniques relied upon partial removal of selected areas of the media substrate on which the magnetic layer is formed, thereby resulting in different transducer head/media surface spacings having an effect similar to formation of a pattern of magnetic and non-magnetic surface areas in the layer of magnetic material. However, a drawback associated with each of these techniques is formation of topographical patterns in the surface of the media, engendering media performance concerns such as transducer head flyability and corrosion, e.g., due to uneven lubricant thickness and adhesion.

As for formation of patterned magnetic media via ion irradiation, a drawback associated therewith is the requirement for use of a high dose of ion irradiation for sufficient suppression of the magnetic properties of the magnetic layer at the selectively irradiated surface areas. Such high dose ion irradiation typically requires an extended processing interval and removal of the ion-irradiated resist materials (utilized for defining the pattern of ion-irradiated surface areas) is difficult.

In view of the foregoing, there exists a need for improved processing methodology and techniques which substantially eliminate the above-described disadvantages, drawbacks, and difficulties associated with the above-described methodologies and techniques for fabricating patterned magnetic media. More specifically, there exists a need for improved processing methodology and techniques for cost-effectively fabricating servo-patterned media, track-patterned (i.e., discrete track) media, and bit-patterned (i.e., discrete bit) media, particularly as utilized in hard disk data/information storage and retrieval systems.

SUMMARY OF THE INVENTION

Other features and benefits that characterize embodiments of the present invention will be apparent upon reading the following detailed description and review of the associated drawings.

A method of fabricating a bit patterned storage medium includes obtaining a substrate having a magnetic layer and forming a mask over the magnetic layer. The magnetic layer is etched through the mask using a reactive ion etch. The etch rate of the mask is reduced by introducing a gas into the reactive ion etch.

BRIEF DESCRIPTION OF THE DRAWINGS

FIGS. 8A, 8B and 8C is a side cross-sectional view showing steps during the fabrication of a bit pattern media using a process in accordance with the present invention.

DETAILED DESCRIPTION OF ILLUSTRATIVE EMBODIMENTS

Figure 1:
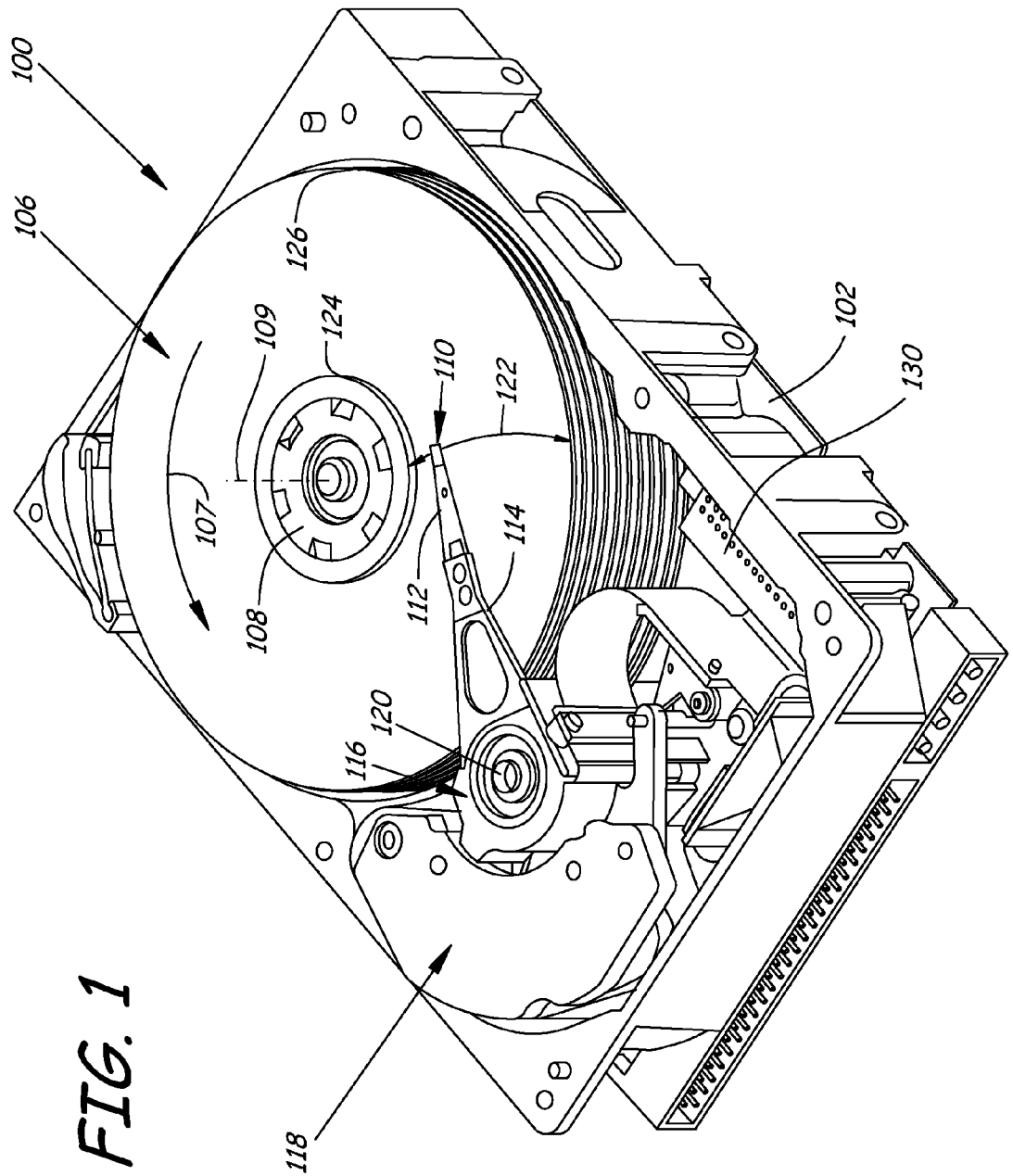
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown). The individual disks illustrated in FIG. 1, in this example, comprise bit pattern media which are fabricated in accordance with the present invention.

As storage densities have increased, various techniques have been used to increase the amount of data which can be stored on a given area of a surface of a storage medium such as a disk surface of one of the disks in disk pack 106 shown in FIG. 1. One technique which has been used to increase the storage density is to form physical bit locations on the surface of the disk. Such a configuration is referred to as a Bit Patterned Media (BPM). There are a number of techniques which can be used to form such a pattern storage medium.

A patterned storage medium is typically difficult to fabricate because it is difficult to form small patterns in magnetic material. More specifically, magnetic materials, such as alloys containing Co, Ni, Fe, and others, are difficult to etch using a dry etching process such as reactive ion etching (RIE). Various techniques have been used involving the use of hard mask materials and dry etch processes. Similarly, etched chemistries have been proposed but have typically had drawbacks when patterning vary small features, on the order of 100 nm or less and closely spaced features.

One typical approach used with reactive dry etching processes is to combine an appropriate hard mask and an appropriate reactive ion etching chemistry, such that the process is highly selective between the material to be etched and the hard masked material. This tends to be difficult because alloys which contain magnetic material frequently have relatively slow etching rates using most reactive ion etching chemistries. In general, prior art techniques have focused on increasing the rate at which the reactive ion etch etches the magnetic material.

In one aspect, the present invention recognizes that improved etching in such configurations can be achieved without changing the rate at which the magnetic material is etched, but rather changing the rate at which the mask is etched. More specifically, the present invention includes reducing the rate at which a mask is etched relative to the rate at which the underlying magnetic material is etched. In a specific example, the technique comprises the introduction of a gas into a reactive ion etch process. In a specific example, this method can be used to fabricate a bit patterned storage media, also called a bit pattern media (BPM) for use in high density data storage.

Figure 2:
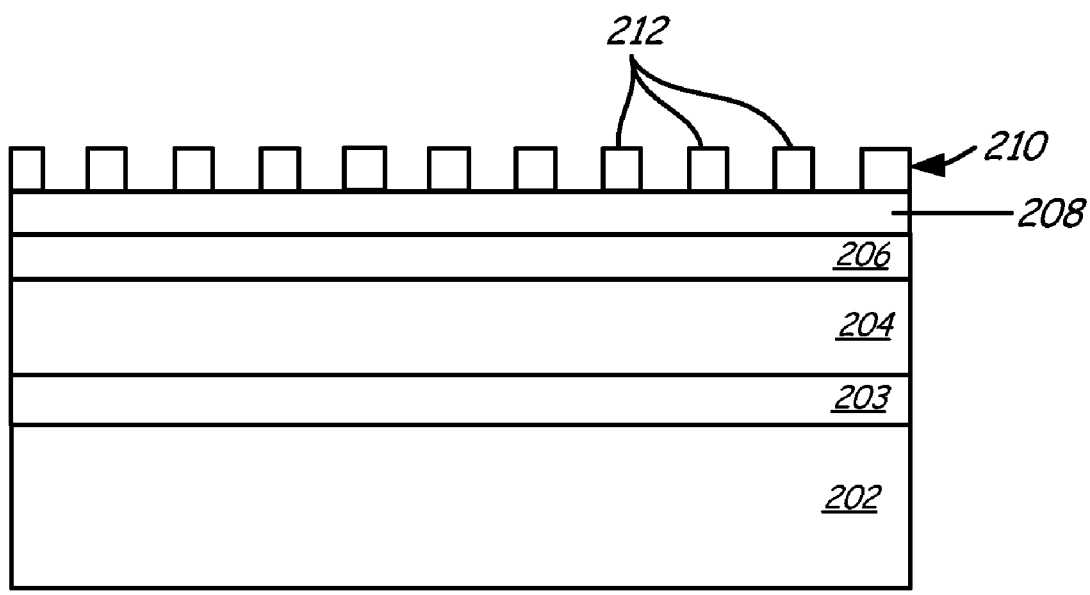
FIG. 2 is a side cross-sectional view of a bit patterned media fabricated using a process in accordance with the present invention.

FIG. 2 is a simplified cross-sectional view of a bit pattern media 200 of the type used to, for example, provide a disk in the disk drive of FIG. 1. In this configuration, media 200 includes a substrate 202 which typically comprises aluminum or glass, but may comprise other materials such as Si. The substrate 202 carries an adhesion layer 203 which typically comprises a layer of Ta having a thickness of between about 5-10 nm. A soft underlayer (SUL) 204 is deposited on the adhesion layer 202 and typically comprises NiFe or CoNiFe having a thickness of about 200 nm. A second adhesion layer 206 is carried on SUL layer 204 and typically comprises Ta having a thickness of about 5-10 nm. A seed layer 208 is deposited on adhesion layer 206. The seed layer 208 is selected based upon what type of magnetic material will be deposited. For example, CoPtCr the seed layer is typically Ru, Cr, or some Ru/Cr alloy. The seed layer 208 has a thickness of about 5-20 nm. A magnetic media layer 210 is deposited on the seed layer 208. For a typical bit pattern media applications, the magnetic media layer 210 ca comprise, for example, $Co_3Pt$, CoPtCr or FePt having a thickness of about 10-20 nm. In FIG. 2, the layer 210 is shown as a patterned layer for use in magnetic recording. The layer 210 comprises a plurality of bit locations 212 which have been fabricated in accordance with the techniques of the present invention. In such a configuration, data is stored on the bit locations 212 using known techniques involving a read and/or write transducer for selectively magnetizing the locations 212.

Figure 3:
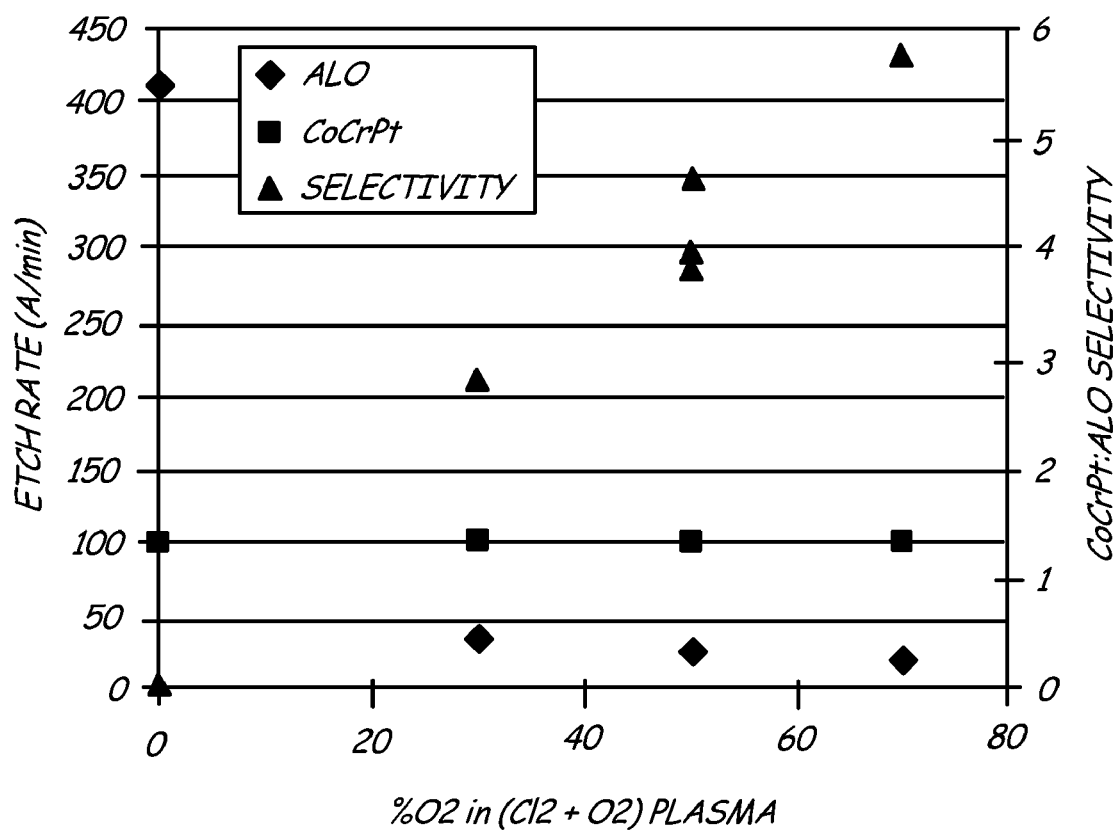
FIG. 3 is a graph showing etch rate and selectivity versus percent oxygen in a reactive ion etch process.

FIG. 3 is a graph of etch rate in angstroms per minute and CoCrPt:ALO selectivity versus the percent of oxygen in the $Cl_2+O_2$ RIE reactive ion etch (RIE) plasma. In this example, the mixing of the $O_2$ gas into the $Cl_2$ gas in the RIE process changes the etch rate of alumina by a factor of about 20. However, note that as illustrated in FIG. 3, the etch rate of CoPtCr does not change. Thus, an increased etch rate selectivity of CoPtCr to $AL_2O_3$ (of about 6 to 1) can be achieved which is suitable for patterning the CoPtCr layer 210 shown in FIG. 2. In various experiments, the etch rate of alumina has been reduced by a factor of about 50 (about 420 Å/min in $Cl_2$ plasma, reduced to 8 Å/min with the addition of $O_2$) which results in a selectivity of more than 12:1.

Figure 4:
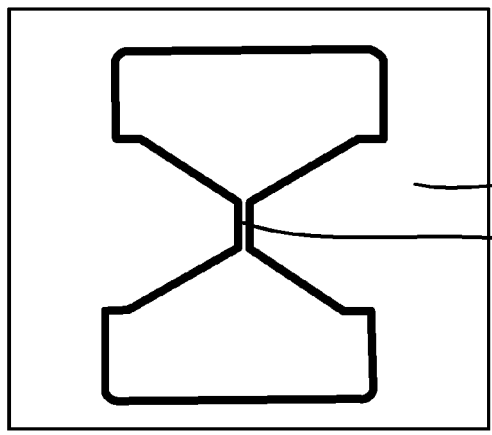
FIG. 4 is a top plan view of a test pattern fabricated using the present invention.
Figure 5:
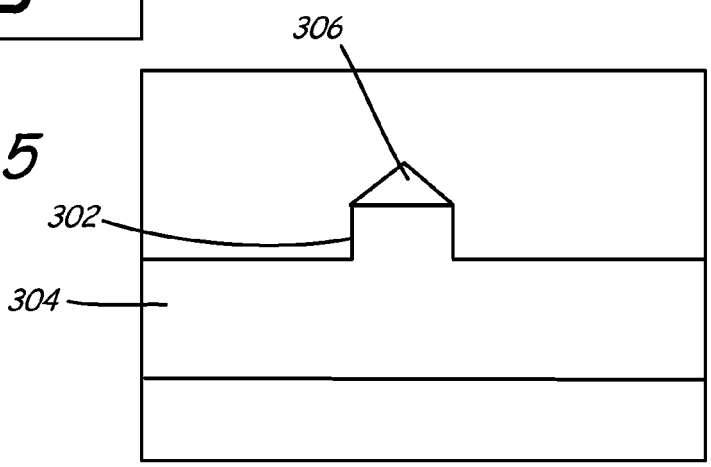
FIG. 5 is a side cross-sectional view of the test pattern of FIG. 4.

A number of tests were performed using the processing method of the present invention. For example, FIG. 4 is a top plan view of a "dog bone" test structure 300. Such a test structure is commonly used when processing a very narrow line, or developing a process for fabricating such a line. The two large "bump" areas on either end of the line anchor the thin line at both ends so it is mechanically stable it is not damaged during processing. Further, these end areas also make it easier to identify the narrow line when observing the specimen through a microscope. Such a structure is often used when developing a process for a magnetic write pole, whether it is etched or plated, as it has a shape which is similar to a write pole. The test structure 300 was formed using an electron beam lithography tool into a 300 nm thick resist layer which covered a layer of alumina. The alumina layer was deposited over a layer of CoPtCr. The pattern of the dog bone structure was transferred into the alumina hard mask layer using a $BCl_3$ reactive ion etch process. Next, the pattern was transferred into the CoPtCr layer using the $Cl_2+O_2$ reactive ion etching technique discussed above. The resulting dog bone structure 300 was formed having a narrow section 302. FIG. 5 is a cross-sectional view of the narrow portion 302 of the test structure 300 shown in FIG. 4. In FIG. 5, the CoPtCr layer 304 can be seen with some of the remaining alumina hard mask 306. The alumina hard mask 306 can be removed using a $BCl_3$ reactive ion etch process. Such a process can be preferable because the entire processing phase can be performed in a sequence using a single tool, $BCl_3$ reactive ion etch for etching the hard mask, $Cl_2+O_2$ reactive ion etch for etching the magnetic medium, and an optional $BCl_3$ reactive ion etch to remove any remaining hard mask. For the entire sequence, the substrate may remain in a vacuum and does not need to be handled outside of the equipment.

Figure 6:
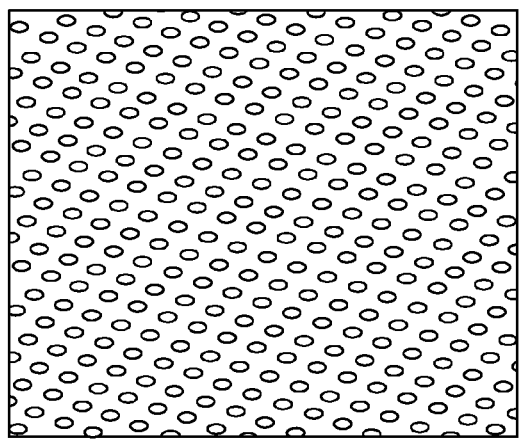
FIG. 6 is a top perspective view and FIG. 7 is an enlarged perspective view showing a bit pattern media fabricated in accordance with the present invention.
Figure 7:
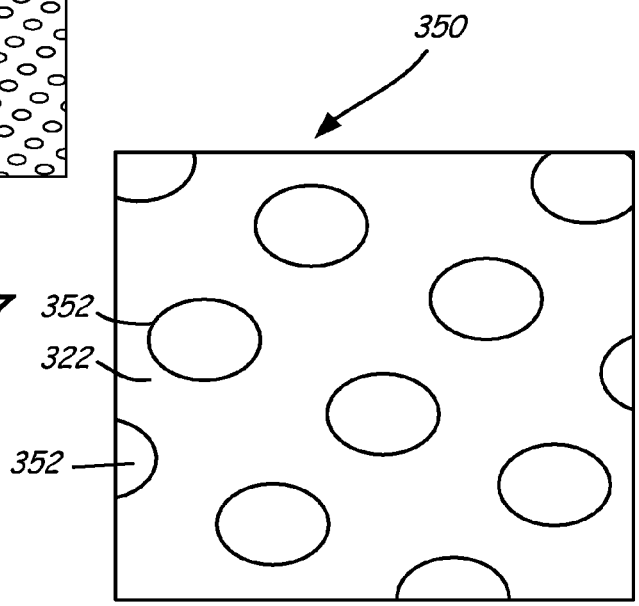

FIGS. 6 and 7 are perspective views which show bit pattern media 350 patterned in accordance with the present invention. FIG. 7 is an enlarged view of the bit patterned media 350 of FIG. 6 and shows the individual dots or bit locations 352. In this example, a pattern comprising an array of small 100 nm diameter dots were written by e-beam lithography using an HSQ (hydrogen silsesquioxane) resist. The dot pattern was transferred into an alumina hard mask as discussed above using $BCl_3$ reactive ion etching. Next, the pattern was transferred into the CoPtCr using a $CL_2+O_2$ reactive ion etch. Although any percent range may be used, in a preferred embodiment, the percent of $O_2$ gas is between about 20% and about 80%.

Although the above examples describe patterning CoPtCr, the present invention is applicable to other magnetic materials including CoFe, NiFe, CoNiFe, NiFeCr, CoFeB, FePt, CoPt, and other alloys. The technique can be used to pattern a structure with very small critical dimensions into a thin film stack that includes magnetic alloys, such as magnetic write poles, magnetic readers, magnetic access memory (MRAM) cells, etc.

Although the above description relates to the addition of $O_2$ gas into the reactive ion etch process, other gases may be used. In the process of the invention, the oxygen forms strong chemical bonds on the alumina surface thereby inhibiting the removal of the Al atoms from the $Al_2O_3$ lattice by the Cl atoms. Other gases, such as N and F containing gases, are expected to have similar properties. Further, the present invention is not limited to an alumina hard mask material. In one configuration, the hard mask can be any appropriate masking material containing oxides. Specific examples include $Ta_2O_5$, $ZrO_2$, $Y_2O_3$, $TiO_2$, $HfO_2$, and others.

FIGS. 8A, 8B and 8C are cross-sectional views showing steps in accordance with the present invention.

Layers in FIGS. 8A-8C which are similar to those shown in FIG. 2 have retained their numbering. In FIG. 8A, an alumina layer 330 having a thickness of 20 nm is shown as being depositing upon the CoPtCr layer 210. A HSQ resist pattern 332 is patterned over the alumina layer 330. The structure is subjected to $BCl_3$ reactive ion etching (RIE) yielding the formation shown in FIG. 8B. This process transfers the HSQ pattern 332 into the alumina layer 330. Next, the structure undergoes a $Cl_2+O_2$ reactive ion etch yielding a structure shown in FIG. 8C. This step transfers the pattern into the CoPtCr layer 210. As illustrated in FIG. 8C, some of the alumina layer 330 may remain following the etching process. This alumina layer 330 can be removed using an alumina etchant as desired. Further, the etching may remove some of the underlying seed layer 208, and may even etch some of the adhesion layer 206.

The alumina layer can be deposited using any appropriate technique for example sputtering, reactive sputtering, ion beam deposition, evaporation, pulsed laser deposition, atomic layer deposition, etc. Although the initial pattern is shown as being fabricating using an HSQ electron beam resist pattern, other patterning techniques can be used including optical lithography, imprint lithography, molecular implant lithography, self organized molecular arrays, etc.

Figure 9:
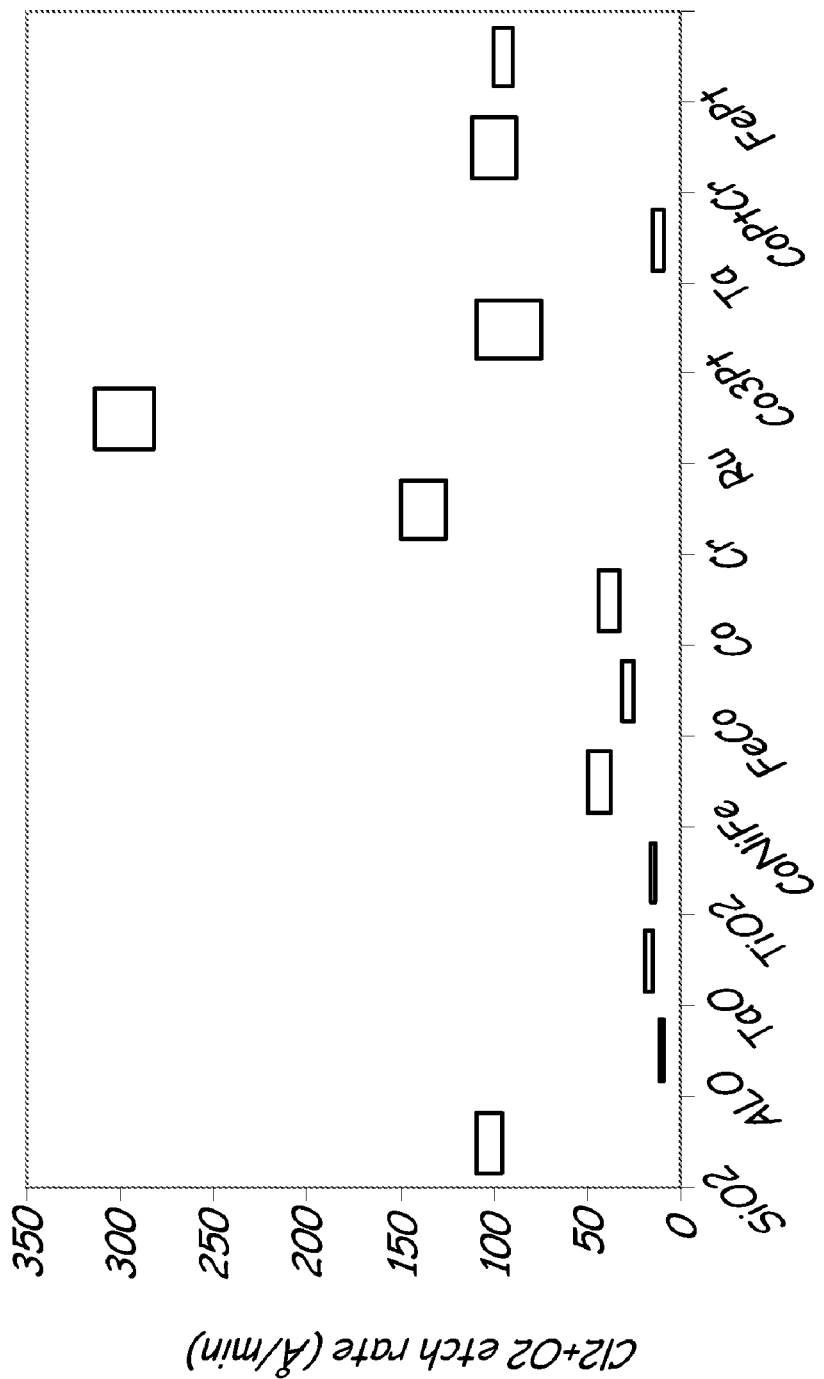
FIG. 9 is a graph showing etch rates of various materials in a $Cl_2+O_2$ reactive ion etch.

FIG. 9 is a graph showing etch rates of various materials when exposed to the $Cl_2+O_2$ reactive ion etch process. In the graph, the size of the rectangle indicates a lower-upper limit to the measured etch rate. This graph illustrates that, with the exception of $SiO_2$, all of the oxides etch at a rate which is much slower than the metals discussed. Note that some prior art techniques have etched Cr and Ru using a $Cl_2+O_2$ reactive ion etch. However, such techniques did not include the use of a metal oxide hard mask. As lithographic masks are reaching smaller and smaller dimensions on their Cr mask, the process of the present invention may also be useful with these materials. Of interest is the relatively slow Ta. The Ta forms a thin layer of tantalum-oxide in the $Cl_2+O_2$ plasma which etches relatively slowly. Thus, in some configurations, the hard mask layer 330 can be fabricated using a layer of Ta and the first etch step would use $SF_6$ or $CF_4$ reactive ion etches, or some other flourine based reactive ion etch. In such a configuration, even a pure $Cl_2$ reactive ion etch may be used as the plasma etch is Ta very quickly, on the order of 5000 to 10,000 Å per minute. Other materials which may also be used for the hard mask include W, Ti, and in some applications Al.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements or steps may vary depending on the particular application for the process while maintaining substantially the same functionality without departing from the scope and spirit of the present invention. In addition, although the preferred embodiment described herein is directed to a bit patterned media for a storage system, it will be appreciated by those skilled in the art that the teachings of the present invention can be applied to patterning of magnetic materials in general, without departing from the scope and spirit of the present invention. Although $Cl_2+O_2$ is discussed, chlorine oxides of the form $Cl_xO_y$ may be used where x=1-2 and y=1-7. In another example, a $Cl_2+N_2$ RIE process is used with an AlN hard mask. Although etching of magnetic metals has been a focus of the above discussion, the present invention is applicable to patterning non-magnetic metals as well.

What is claimed is:

1. A method comprising:
   forming a hard mask over a magnetic layer;
   etching the magnetic layer through the hard mask using a reactive ion etch;
   reducing the etch rate of the hard mask by introducing, into the reactive ion etch, a gas that promotes a formation of chemical bonds, which inhibit a removal of the hard mask by the reactive ion etch, on a surface of the hard mask that is exposed to the reactive ion etch; and
   removing the hard mask upon completion of etching using the reactive ion etch.

2. The method of claim 1 wherein the gas comprises oxygen.

3. The method of claim 1 wherein the reactive ion etch uses chlorine.

4. The method of claim 1 wherein the hard mask comprises $Al_2O_3$.

5. The method of claim 1 wherein the magnetic material includes material from the group of materials consisting of Co, Ni, or Fe.

6. The method of claim 1 wherein the magnetic material comprises CoPtCr.

7. The method of claim 1 wherein forming a hard mask comprises depositing a mask layer and forming a pattern in the mask layer.

8. The method of claim 7 wherein forming a pattern in the mask layer comprises forming a pattern using e-beam lithography.

9. The method of claim 7 wherein forming a pattern in the mask layer comprises reactive ion etching the mask layer.

10. The method of claim 9 wherein reactive ion etching the mask layer comprises applying a $BCl_3$ reactive ion etch.

11. The method of claim 1 wherein the hard mask over the magnetic layer is selected from the group of masks comprising $Ta_2O_5$, $ZrO_2$ or $Y_2O_3$.

12. The apparatus of claim 1 wherein the magnetic layer is selected from the group of magnetic layers consisting of CoFe, NiFe, CoNiFe, NiFeCr, CoFeB, FePt, CoPt.

13. The method of claim 1 including a layer of NiFe below the magnetic layer.

14. The method of claim 1 wherein the reactive ion etch comprises $Cl_2$ gas and $O_2$ gas.

15. The method of claim 14 wherein the $O_2$ gas comprises between about 20% and about 80% of the gas in the reactive ion etch.

16. A method comprising:
    forming a metal oxide hard mask over a magnetic layer;
    etching the magnetic layer through the metal oxide hard mask using a reactive ion etch that comprises chlorine;
    reducing the etch rate of the metal oxide hard mask by introducing oxygen into the reactive ion etch; and
    removing the metal oxide hard mask upon completion of etching using the reactive ion etch.

17. The method of claim 16 wherein the metal oxide hard mask comprises $Al_2O_3$.

18. The method of claim 16 wherein the magnetic material includes material from the group of materials consisting of Co, Ni, or Fe.

19. The method of claim 16 and further comprising including a layer of NiFe below the magnetic layer.

* * * * *